(12) United States Patent
Song et al.

(10) Patent No.: US 10,570,654 B2
(45) Date of Patent: Feb. 25, 2020

(54) SOLAR-POWER-GENERATION-TYPE SLIDING WINDOW ASSEMBLY

(71) Applicants: Hyundai Motor Company, Seoul (KR); Kia Motors Corporation, Seoul (KR)

(72) Inventors: Mi Yeon Song, Seoul (KR); Hae Yoon Jung, Gyeonggi-do (KR); Eun Yeong Lee, Seoul (KR); Sang Hak Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 168 days.

(21) Appl. No.: 15/822,123

(22) Filed: Nov. 25, 2017

(65) Prior Publication Data

US 2019/0112855 A1     Apr. 18, 2019

(30) Foreign Application Priority Data

Oct. 13, 2017   (KR) .................. 10-2017-0132952

(51) Int. Cl.
| | | |
|---|---|---|
| *E05D 13/00* | (2006.01) | |
| *E05D 15/06* | (2006.01) | |
| *H02S 20/26* | (2014.01) | |
| *H02S 10/40* | (2014.01) | |
| *H02S 30/10* | (2014.01) | |
| *H02S 40/34* | (2014.01) | |
| *H02S 20/30* | (2014.01) | |
| *E06B 7/28* | (2006.01) | |
| *H02S 40/38* | (2014.01) | |

(52) U.S. Cl.
CPC ..... *E05D 15/0665* (2013.01); *E05D 15/0686* (2013.01); *E06B 7/28* (2013.01);
(Continued)

(58) Field of Classification Search
CPC ..... E05D 15/0665; H02S 40/34; H02S 40/38; H02S 10/40; H02S 20/26; E06B 7/28
(Continued)

(56) References Cited

U.S. PATENT DOCUMENTS

2011/0107674 A1* 5/2011 Sauter .................. E06B 7/2318
49/316
2011/0225885 A1* 9/2011 Van Tassell, III .... E05F 15/635
49/25
(Continued)

FOREIGN PATENT DOCUMENTS

| JP | H 7-231110 | 8/1995 |
|---|---|---|
| KR | 20-2011-0008560 | 9/2011 |

(Continued)

*Primary Examiner* — Jerry E Redman
(74) *Attorney, Agent, or Firm* — Mintz Levin Cohn Ferris Glovsky and Popeo, P.C.; Peter F. Corless

(57) ABSTRACT

A solar-power-generation-type sliding window assembly for maintaining an electrical connection between a solar cell-mounted to a sliding window and a battery charged by the power generated by the solar cell during normal operation regardless of the position of the sliding window is provided. The solar-power-generation-type sliding window assembly includes a sliding window that has a solar cell and configured to be opened or closed via sliding thereof. A window frame is fixed to an opening in a wall and supports the sliding window. A plurality of rollers are rotatably disposed in the sliding window and supports the movement of the sliding window inside the window frame. Additionally, a connection terminal is disposed on a selected roller among the rollers and electrically interconnects an output terminal of the solar cell disposed on the sliding window and a frame terminal disposed on the window frame.

7 Claims, 4 Drawing Sheets

(52) U.S. Cl.
CPC .............. *H02S 10/40* (2014.12); *H02S 20/26*
(2014.12); *H02S 20/30* (2014.12); *H02S 30/10*
(2014.12); *H02S 40/34* (2014.12); *E05Y*
*2400/60* (2013.01); *E05Y 2400/656* (2013.01);
*E05Y 2900/148* (2013.01); *H02S 40/38*
(2014.12)

(58) Field of Classification Search
USPC .................................................. 49/360, 425
See application file for complete search history.

(56) References Cited

U.S. PATENT DOCUMENTS

| | | | | |
|---|---|---|---|---|
| 2012/0272576 | A1* | 11/2012 | Van Tassell, III | E05F 15/641 49/70 |
| 2014/0174502 | A1* | 6/2014 | Lucas Morata | F16H 1/16 136/246 |
| 2015/0274259 | A1* | 10/2015 | Ziethe | B60J 7/0084 114/202 |
| 2017/0158108 | A1* | 6/2017 | Elbaz | B60P 3/0255 |
| 2017/0328068 | A1* | 11/2017 | Shargani | E04F 10/02 |
| 2019/0112855 | A1* | 4/2019 | Song | H02S 20/30 |
| 2019/0137679 | A1* | 5/2019 | Kroeger | B32B 17/10669 |
| 2019/0174651 | A1* | 6/2019 | Crawford | G06F 21/31 |
| 2019/0199277 | A1* | 6/2019 | Tordo | H02S 20/32 |

FOREIGN PATENT DOCUMENTS

| | | |
|---|---|---|
| KR | 10-2012-0053119 | 5/2012 |
| KR | 10-2011-0105922 | 10/2012 |
| KR | 10-2013-0006817 | 1/2013 |
| KR | 10-2013-0111505 | 10/2013 |
| KR | 10-1315272 | 10/2013 |
| KR | 10-1495310 | 2/2015 |

\* cited by examiner

SOLAR-POWER-GENERATION-TYPE SLIDING WINDOW ASSEMBLY

CROSS-REFERENCE TO RELATED APPLICATION

This application claims under 35 U.S.C. § 119(a) the benefit of priority to Korean Patent Application No. 10-2017-0132952 filed on Oct. 13, 2017, the entire contents of which are incorporated herein by reference.

BACKGROUND

(a) Technical Field of the Disclosure

The present disclosure relates to a solar-power-generation-type sliding window assembly, and more particularly, to a solar-power-generation-type sliding window assembly that enables the regular power generation and output of a solar cell provided on a sliding window.

(b) Background Art

Recently, as the installation of solar cells on buildings has gradually increased, attempts have been made to apply translucent solar cells to building windows. These attempts have mainly been applied to fixed windows that cannot be opened or closed. However, for solar cells applied to fixed windows, when the movement of solar cells does not occur, an electrical connection structure may be implemented without consideration as to the movement of solar cells. Therefore, for the electrical connection structure of solar cells applied to fixed windows to be applied to movable windows to enable the window to be opened or closed, an electrical connection structure that considers the movement of solar cells due to the opening and closing of the window is required.

In particular, the electrical connection between the solar cell and the battery that stores the power generated by the solar cell may not be maintained when the solar cell moves as the window is opened or closed. Therefore, to charge the power of the solar cell in the battery during normal use, there is demand for an electrical connection structure capable of maintaining an electrical connection when the solar cell moves due to the opening or closing of the window.

The above information disclosed in this section is merely for enhancement of understanding of the background of the disclosure and therefore it may contain information that does not form the prior art that is already known in this country to a person of ordinary skill in the art.

SUMMARY

The present disclosure provides a solar-power-generation-type sliding window assembly capable of maintaining an electrical connection between a solar cell, which is mounted to a sliding window, and a battery in which the power generated by the solar cell is charged during normal usage regardless of the position of the sliding window, which is mounted in a sliding manner to the building wall and configured to be opened or closed.

In an aspect of an exemplary embodiment of the present disclosure, a solar-power-generation-type sliding window assembly may include a sliding window having at least one solar cell and configured to be opened or closed via sliding movement, a window frame fixed to an opening in a wall and configured to support the sliding window to be opened or closed, a plurality of rollers rotatably disposed in the sliding window and configured to support the sliding of the sliding window within the window frame, and a connection terminal disposed on a selected roller among plurality of the rollers and configured to electrically interconnect an output terminal of the solar cell disposed on the sliding window and a frame terminal disposed on the window frame.

In some an exemplary embodiments, the connection terminal may be disposed on an outer circumferential surface of the roller that is in contact with the output terminal and the frame terminal disposed between the sliding window and the window frame. The output terminal may be disposed on an outer circumferential surface of the sliding window that is in contact with the outer circumferential surface of the roller and may be electrically connected to the solar cell. The frame terminal may be disposed on an inner circumferential surface of the window frame that is in contact with the outer circumferential surface of the roller, and the frame terminal extends along a movement path of the roller.

In an exemplary embodiment, the connection terminal may be formed to extend in a circumferential direction of the roller on the outer circumferential surface of the roller and may be configured to continuously be in contact with both with the output terminal and the frame terminal during rotation of the roller based on movement of the sliding window. In another exemplary embodiment, the sliding window may include a dusting member configured to remove a foreign substance generated on a surface of the frame terminal. The dusting member may be disposed on each of opposite sides of the roller in a movement direction of the roller.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not imitative of the present disclosure, and wherein.

Figure 1:
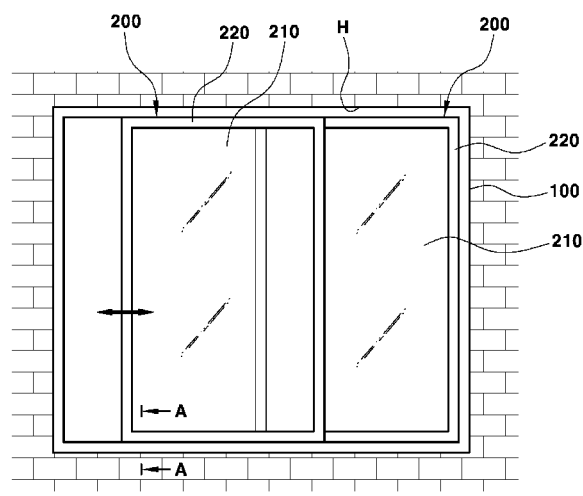
FIG. 1 is an exemplary view illustrating a solar-power-generation-type sliding window assembly according to an exemplary embodiment of the present disclosure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiments of the present disclosure will be described in detail with reference to the accompanying drawings to allow those skilled in the art to easily practice the exemplary embodiments. Advantages and features of the present disclosure and methods for achieving the same will be clearly understood with reference to the following detailed description of exemplary embodiments in conjunction with the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

First, it is to be noted that the term "window" refers collectively to a window and a door provided in buildings. The window may be classified into a rotating type and a sliding type, for example, depending on the opening and closing manner thereof. A sliding window may be opened or closed by linearly sliding within a window frame, which is installed to the building wall. In particular, for a sliding-type window having a solar cell, since the solar cell moves simultaneously with the opening and closing movement of the window, it requires an electrical connection structure capable of outputting the power generated by the solar cell to a battery even while the solar cell moves. Thus, the present disclosure provides a solar-power-generation-type sliding window assembly, configured to include an electrical connection structure capable of outputting the power of a solar cell to a battery, which is structurally separated from a window, during use regardless of whether movement of the solar cell occurs.

Figure 2:
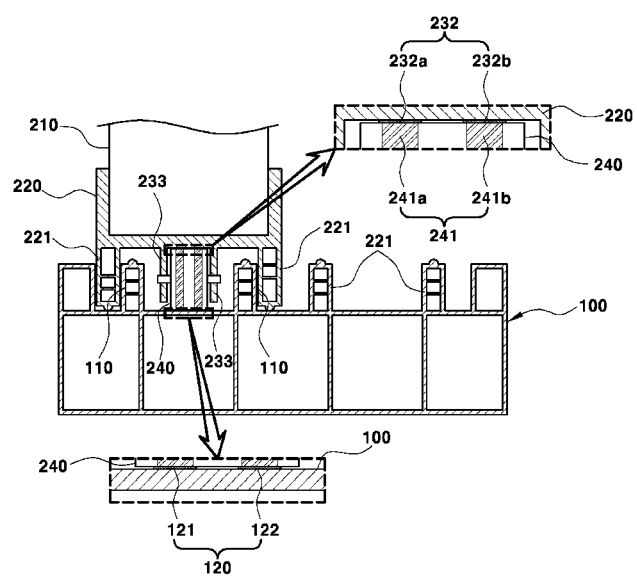
FIG. 2 is an exemplary cross-sectional view taken along line A-A of FIG. 1 according to an exemplary embodiment of the present disclosure.
Figure 3:
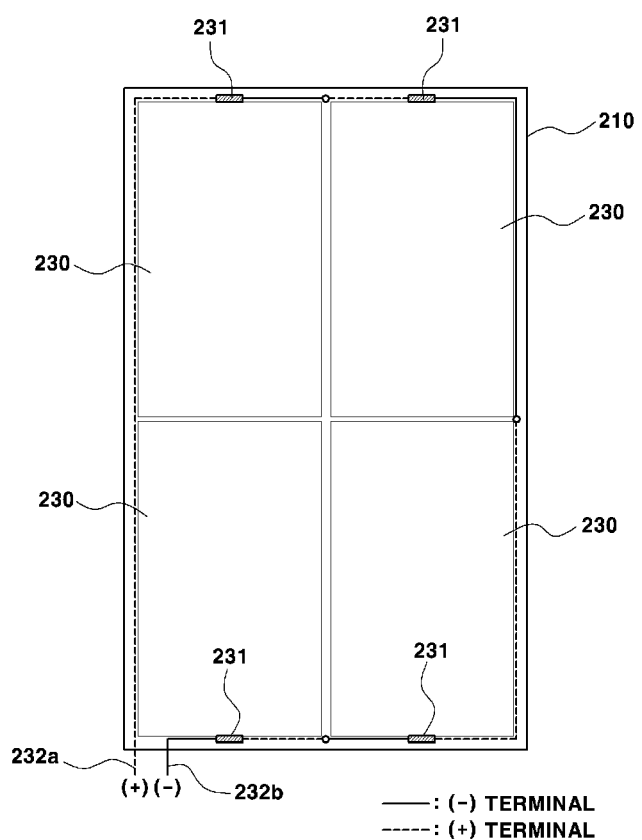
FIG. 3 is an exemplary view illustrating the arrangement of solar cells provided on a window glass according to an exemplary embodiment of the present disclosure.
Figure 4:
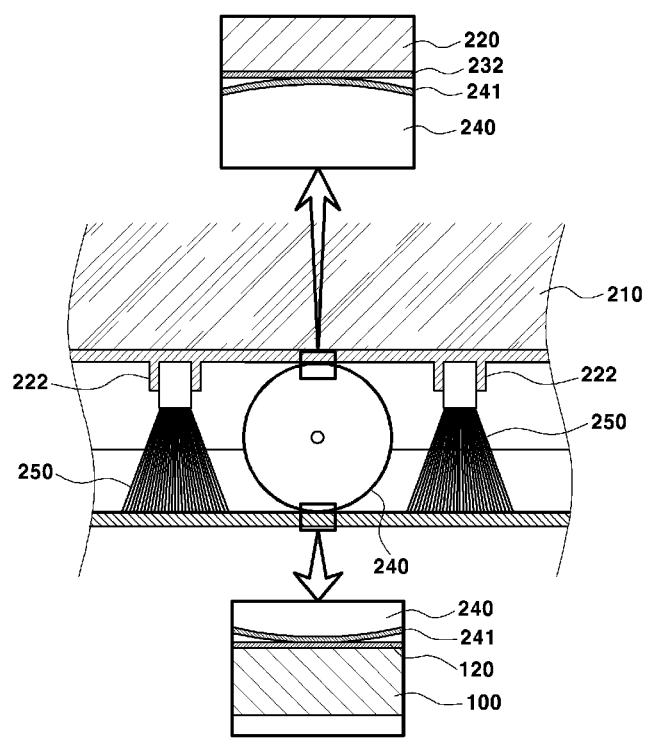
FIG. 4 is an exemplary view illustrating the arrangement of a dusting member provided on a sliding window according to an exemplary embodiment of the present disclosure.

FIG. 1 is an exemplary view illustrating a solar-power-generation-type sliding window assembly according to the present disclosure. FIG. 2 is an exemplary cross-sectional view taken along line A-A of FIG. 1. FIG. 3 is an exemplary view illustrating the arrangement of solar cells provided on a window glass according to the present disclosure. FIG. 4 is an exemplary view illustrating the arrangement of a dusting member provided on a sliding window according to the present disclosure. As illustrated in FIGS. 1 and 2, the solar-power-generation-type sliding window assembly according to the present disclosure may include a window frame 100 disposed within in an opening H, which is formed in the building wall, at least one sliding window 200 configured to slide linearly and disposed in the window frame 100, at least one solar cell 230 integrally formed with the sliding window 200, and a plurality of rollers 240 disposed in the sliding window 200 to support the sliding of the sliding window 200.

The window frame 100 may be a rectangular frame that supports the sliding window 20 in an opening and closing manner while surrounding the sliding window 200. The window frame 100 may include a guide rail 110, configured to guide the linear movement of the sliding window 200, when the sliding window is opened or closed via a sliding movement within the window frame 100. The sliding window 200 may be a sliding-type opening and closing member configured to open or close the opening H in the wall, which is surrounded by the window frame 100. The sliding window 200 may include a plate-shaped window glass 210 and a glass frame 220 surrounding the edge portion of the window glass 210. The glass frame 220 may include a guide slat 221, configured to guide the sliding movement of the sliding window 200 within the window frame 100. The guide slat 221 may include a structure that corresponds to that of the guide rail 110 of the window frame 100 and may be assembled to the guide rail 110 in a linearly movable arrangement.

The guide slat 221 of the glass frame 220 may protrude from the upper-end outer circumferential surface and the lower-end outer circumferential surface of the glass frame 220. The guide rail 110 of the window frame 100, which is aligned with the guide slat 221, may protrude from the upper-end inner circumferential surface and the lower-end inner circumferential surface of the window frame 100. The sliding window 200 may be disposed, along with another sliding window 200, within the window frame 100 to open or close the opening H in the wall in a sliding movement. Additionally, the respective sliding windows 200 may be disposed on opposite front and rear sides in the window frame 100 to prevent interference with each other upon a linear movement thereof. In particular, the window frame 100 may include a plurality of guide rails 110 configured to guide the linear movement of the respective sliding windows 200. In particular, the solar cell 230 may be configured to generate electricity using sunlight and convert the solar energy into electrical energy. The solar cell 230 may be integrally disposed on the sliding window 200 by being coupled to the surface of the window glass 210 or by replacing the window glass 210.

The solar cell 230 may be translucent to secure a predetermined level of translucency of the window glass 210, and a plurality of solar cells may be attached to a single sliding window 200. For example, as illustrated in FIG. 3, when four solar cells 230 are disposed on one window glass 210, the sliding window 200 may include a plurality of junction boxes 231, disposed on the respective solar cells 230 configured to output electricity and are electrically connected in series, and an output terminal 232, configured to output electricity of the solar cells 230 and is electrically connected to the junction boxes 231, which are connected in series.

The sliding window 200 having the integrated solar cell 230 may be configured to open or close the opening H in the wall by moving linearly in a leftward or rightward direction (e.g., in a horizontal direction) within the window frame 100. Therefore, to maintain the electrical connection between the solar cell 230 and a battery, which stores power generated by the solar cell 230, (e.g. a power storage of the building equipped with the sliding window 200) during normal operation regardless of the linear movement of the sliding window 200, the output terminal 232, configured to output the power generated by the solar cell 230 to the battery, may be disposed on the lower-end outer circumferential surface of the glass frame 220 (see FIG. 2). The output terminal 232 may be configured to be electrically connected to the junction box 231 of the solar cell 230 to discharge the power of the solar cell 230 and may be fixed to the lower-end outer circumferential surface of the glass frame 220.

As illustrated in FIGS. 2 and 4, the output terminal 232 may include a (+) terminal 232*a* and a (−) terminal 232*b* configured to output power of the solar cell 230, and the (+) terminal 232*a* and the (−) terminal 232*b* may be disposed parallel to each other on the lower-end outer circumferential surface of the glass frame 220 and extends to a predetermined position on the glass frame 220 where a predetermined selected roller 240 is mounted. The predetermined roller 240 may include the roller 240 having a connection terminal 241 to form the electrical connection between the output terminal 232 of the solar cell 230 and a frame terminal 120 of the window frame 100 among the plurality of rollers 240 disposed on the sliding window 200. In particular, the frame terminal 120 may be disposed on the lower-end of the inner circumferential surface of the window frame 100 that surrounds the sliding window 200, that is, on the lower-end inner circumferential surface of the window frame 100 that supports the linear movement of the sliding window 200. The frame terminal 120 may be configured to discharge the power generated by the solar cell 230, which has been discharged via the output terminal 232 to the battery of the building.

The frame terminal 120 may be electrically connected to the battery to discharge the power generated by the solar cell 230 to the battery of the building. The frame terminal 120 may include a (+) terminal 121 and a (−) terminal 122, that correspond to the output terminal 232 to receive the power generated by the solar cell 230 and the (+) terminal 121 and the (−) terminal 122 may be formed to extend along the movement path of the roller 240, which corresponds to the linear movement path of the sliding window 200, and may be disposed parallel to each other at a constant distance on the lower-end inner circumferential surface of the window frame 100.

In particular, the frame terminal 120 may be disposed at least in the path, along which the roller 240 passes upon opening or closing of the sliding window 200 in the lower-end inner circumferential surface of the window frame 100. Accordingly, the frame terminal 120 may be disposed to correspond to the movement path of the roller 240 upon opening or closing of the sliding window 200. For example, the lower-end inner circumferential surface of the window frame 100 may be an inner circumferential surface area that faces the lower-end outer circumferential surface of the sliding window 200 on which the roller 240 is disposed of the inner circumferential surface of the window frame 100 that faces the outer circumferential surface of the sliding window 200. In order form the electrical connection between the output terminal 232 and the frame terminal 120 during normal operation, the roller 240, which supports the linear movement of the sliding window 200 between the lower-end outer circumferential surface of the sliding window 200 and the lower-end inner circumferential surface of the window frame 100, may include a connection terminal 241.

As illustrated in FIGS. 2 and 4, the roller 240 may be rotatably disposed on the lower-end outer circumferential surface of the glass frame 220 (e.g., the lower-end outer circumferential surface of the sliding window 200), and may be rotatably supported between a pair of shaft support portions 233, which protrude from the lower-end outer circumferential surface of the glass frame 220. In particular, the connection terminal 241 may be disposed on the outer circumferential surface of the roller 240 in contact with both with the lower-end outer circumferential surface of the glass frame 220 and with the lower-end inner circumferential surface of the window frame 100. Accordingly, the connection terminal 241 on the outer circumferential surface of the roller 240 may be in linear contact with the output terminal 232 disposed on the lower-end outer circumferential surface of the glass frame 220 and may also be in linear contact with the frame terminal 120 disposed on the lower-end inner circumferential surface of the window frame 100. This linear contact may be continuously maintained when the roller 240 is configured to rotate in conjunction with the movement of the sliding window 200.

The connection terminal 241 may include a (+) terminal 241*a* and a (−) terminal 241*b* to correspond to the output terminal 232 and the frame terminal 120, and the (+) terminal 241*a* and the (−) terminal 241*b* may be formed to continuously extend in the circumferential surface and may be disposed parallel to each other at a distance on the outer circumferential surface of the roller 240. When the connection terminal 241 is provided on the surface of the roller 240 configured to move linearly along with the sliding window 200 upon the opening or closing of the sliding window 200 and configured to interconnect the output terminal 232 of the solar cell 230 disposed on the sliding window 200 and the frame terminal 120 disposed on the window frame 100, the power of the solar cell 230 may be output to the battery during normal operation regardless of whether the sliding window 200 is open or closed. Accordingly, the power generated by the solar cell 230 may be output through the junction box 231 and the output terminal 232 may be transmitted to the battery of the building during normal operation via the connection terminal 241 and the frame terminal 120 to charge the battery.

In particular, the output terminal 232 may be disposed on the lower-end outer circumferential surface of the sliding window 200 which is in contact with the outer circumferential surface of the roller 240. The frame terminal 120 may be disposed on the lower-end inner circumferential surface of the window frame 100 which is in contact with the outer circumferential surface of the roller 240, along the movement path of the roller 240. The connection terminal 241 may be disposed in the circumferential direction on the outer circumferential surface of the roller 240 which is in contact both with the output terminal 232 and with the frame terminal 120 disposed between the sliding window 200 and the window frame 100 to electrically interconnect the output terminal 232 and the frame terminal 120 via contact therewith. Accordingly, the electrical connection between the output terminal 232 and the frame terminal 120 may be maintained during rotation of the roller 240 based on the opening or closing of the sliding window 200.

In other words, the roller 240 may be configured to rotate when the connection terminal 241 disposed on the outer circumferential surface thereof at a predetermined position is continuously in contact with the output terminal 232 and the frame terminal 120 which enables the output terminal 232 and the frame terminal 120 to be continuously connected to each other during normal operation. For example, the output terminal 232, the frame terminal 120, and the connection terminal 241 may be formed respectively by coating the surfaces of the glass frame 220, the window frame 100, and the roller 240 with a metal material having excellent wear resistance. Additionally, the metal material may be selected from the group consisting of titanium, stainless-steel, silver, copper, aluminum, and combinations thereof. In particular, the output terminal 232 and the frame terminal 120 may be disposed respectively on the lower-end outer circumferential surface of the glass frame 220 and the lower-end inner circumferential surface of the window frame 100 to maintain contact with the connection terminal 241 due to the load of the sliding window 200, but may be also be disposed on the upper-end outer circumferential surface of the glass frame 220 and the upper-end inner circumferential surface of the window frame 100.

Further, when the sliding window 200 is maintained in an open position for an extended duration of time, contact resistance between the connection terminal 241 and the frame terminal 120 may increase due to the accumulation of foreign substances (e.g., dust) on the lower-end inner circumferential surface of the window frame 100. Accordingly, the sliding window 200 may include a dusting member 250 configured to remove foreign substances generated on the surface of the frame terminal 120, thereby maintaining the contact characteristics between the connection terminal 241 and the frame terminal 120.

The dusting member 250 may be disposed on each of the left and right sides of the roller 240 in the movement direction of the sliding window 200 and the roller 240, and may be formed of a material that is advantageous for the removal of foreign substances without causing the wear of the frame terminal 120. For example, the dusting member 250 may be formed of a brush, a sponge, a silicon material or the like. A boss portion 222 may protrude from the lower-end outer circumferential surface of the sliding window 200 for the mounting of the dusting member 250 to position the upper end of the dusting member 250 to be press-fitted into and fixed to the boss portion 222.

As is apparent from the above description, with a solar-power-generation-type sliding window assembly, an electrical connection between a solar cell which is mounted to a sliding window and a battery which is electrically connected to a window frame may be maintained regardless of whether the sliding window is disposed in the opened or closed positon. Accordingly, the power generated by the solar cell disposed on the sliding window in the battery electrically connected to the window frame may be charged during normal operation (e.g., operation within the operating conditions in a close or an open position).1.

An exemplary embodiment of the present disclosure is disclosed herein, but the present disclosure is not limited to the disclosed exemplary embodiments, and, on the contrary, is intended to cover various modifications and equivalent arrangements included within the appended claims and the detailed description and the accompanying drawing of the present disclosure.

What is claimed is:

1. A solar-power-generation sliding window assembly, comprising:
   a sliding window having at least one solar cell and configured to be opened or closed via sliding thereof;
   a window frame fixed to an opening in a wall and configured to support the sliding window;
   a plurality of rollers rotatably disposed in the sliding window and configured to support the sliding of the sliding window inside the window frame; and
   a connection terminal disposed on a predetermined roller among the plurality of rollers and configured to electrically interconnect an output terminal of the solar cell disposed on the sliding window and a frame terminal disposed on the window frame.

2. The assembly of claim 1, wherein the connection terminal is disposed on an outer circumferential surface of the predetermined roller that contacts both the output terminal and the frame terminal between the sliding window and the window frame.

3. The assembly of claim 2, wherein the output terminal is disposed on an outer circumferential surface of the sliding window that is in contact with the outer circumferential surface of the predetermined roller.

4. The assembly of claim 2, wherein the frame terminal is disposed on an inner circumferential surface of the window frame that is in contact with the outer circumferential surface of the predetermined roller, and the frame terminal extends along a movement path of the predetermined roller.

5. The assembly of claim 4, wherein the sliding window includes a dusting member configured to remove a foreign substance generated on a surface of the frame terminal, and the dusting member is disposed on each of opposite sides of the predetermined roller in a movement direction of the predetermined roller.

6. The assembly of claim 5, wherein the sliding window includes a boss portion that protrudes from a lower-end outer circumferential surface of the sliding window to couple the dusting member to dispose the upper end of the dusting member to be coupled to the boss portion.

7. The assembly of claim 2, wherein the connection terminal is formed to extend in a circumferential direction of the predetermined roller on the outer circumferential surface of the predetermined roller, and is configured to continuously be contact both the output terminal and the frame terminal during rotation of the predetermined roller based on movement of the sliding window.

* * * * *